(12) United States Patent
Kimura

(10) Patent No.: US 8,149,450 B2
(45) Date of Patent: Apr. 3, 2012

(54) DOCUMENT MANAGEMENT SYSTEM, DOCUMENT MANAGEMENT METHOD, AND STORAGE MEDIUM

(75) Inventor: Mitsuo Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 870 days.

(21) Appl. No.: 12/186,879

(22) Filed: Aug. 6, 2008

(65) Prior Publication Data

US 2009/0040543 A1 Feb. 12, 2009

(30) Foreign Application Priority Data

Aug. 9, 2007 (JP) ................. 2007-208328

(51) Int. Cl.
*G06K 5/00* (2006.01)
*G06F 3/00* (2006.01)
*G06F 12/14* (2006.01)
*G06F 3/12* (2006.01)

(52) U.S. Cl. .............. 358/1.16; 358/1.14; 358/1.15; 710/13; 710/200

(58) Field of Classification Search ............... 358/1.14, 358/1.15, 1.16; 710/13, 200
See application file for complete search history.

(56) References Cited

U.S. PATENT DOCUMENTS

2005/0076042 A1* 4/2005 Stakutis et al. ............... 707/100
2008/0163364 A1* 7/2008 Ferlitsch ........................ 726/21

FOREIGN PATENT DOCUMENTS

JP 2005-100019 4/2005

* cited by examiner

*Primary Examiner* — Twyler Haskins
*Assistant Examiner* — Fred Guillermety
(74) *Attorney, Agent, or Firm* — Canon USA, Inc., I.P. Division

(57) ABSTRACT

In a document management system according to an embodiment of the present invention, in order to prevent a leakage of information, in a case where a copy of a document is transferred to a media, a deletion processing with respect to the document is disabled. Then, in a case where it is confirmed that document leakage is not performed from the media, the deletion processing with respect to the document from the media is canceled.

7 Claims, 13 Drawing Sheets

| DOCUMENT NAME | NUMBER OF PAGES | OWNER NAME | ACCEPT DATE TIME |
|---|---|---|---|
| APPLICATION FORM | 2 | Tanaka | 01/15/07 10:20 |
| PROJECT BOOK A | 10 | Suzuki | 01/15/07 12:20 |
| RECEIPT | 1 | Okamoto | 01/15/07 13:04 |
| SET A | 8 | Ohtani | 01/20/07 8:24 |
| SUPPLY LIST | 30 | Ohara | 01/20/07 12:00 |
| SET C | 12 | Sawa | 01/20/07 21:09 |

703 — BRING OUT

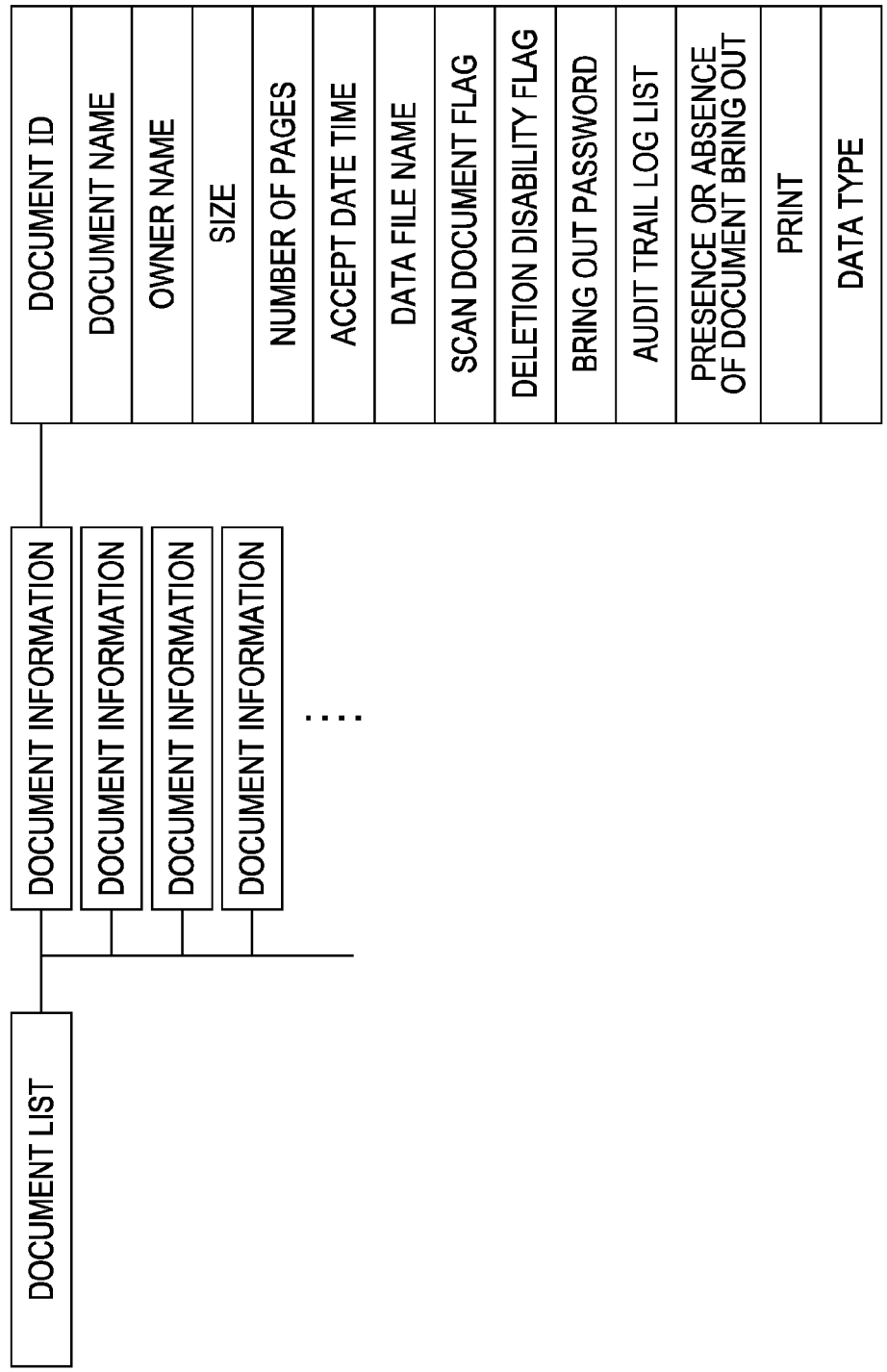

US 8,149,450 B2

DOCUMENT MANAGEMENT SYSTEM, DOCUMENT MANAGEMENT METHOD, AND STORAGE MEDIUM

BACKGROUND OF THE INVENTION

1. Field of the Invention

The present invention relates to a document management system in which an output document and a log are saved as audit trails, a document management method, a computer program, and a storage medium.

2. Description of the Related Art

A printing apparatus having a storage apparatus such as a HD (hard disk) and capable of saving print data and a document prior to conversion into print data exists. Among such printing apparatuses, some printing apparatus also cope with a removal media functioning as a data input and output unit. In the above-described printing apparatus, the print data or the document saved in the HD of the printing apparatus can be saved on a USB memory to be brought out, or a scanned document can be saved on the USB memory to be brought out. The document brought out on the USB memory can be saved in another printing apparatus (at a brought out destination) or printed. Also, it is conceivable that the document brought out on the USB memory is edited with a PC (personal computer) to be saved, and is saved in another printing apparatus or printed.

On the other hand, an internal control is in effect, and an audit trail is an important issue in a manner that a log of "when" documents in a company are output by "whom" is recorded, and the output document is saved. Not only for the case of the document output in the printing apparatus, but also for the case of bringing out the document from the printing apparatus on the removal media, there is a demand that the output log at the brought out destination is collected, and the output document is save as a record.

As a method of solving such a problem, a technology for recording a log at the time of the printing on the removal media is known (Japanese Patent Laid-Open No. 2005-100019).

However, according to the method of recording the log at the time of the printing on the removal media, there is a probability that the original data may be deleted while the data is brought out on the removal media.

In that case, if the removal media brought out is lost, although the record that the data is brought out on the removal media remains, it is impossible to check which kind of data was brought out. Alternatively, even when the data is brought back on the removal media, if the editing is carried out at the brought out destination, it is impossible to check what the original data was.

On the other hand, the following case is also conceivable. That is, there is no need to keep the data from the beginning in such occasions where deletion of the data brought out on the removal media is disabled and where the data output or editing is not carried out at the brought out destination and the data is simply brought back. Even in such a case though, the data remains in the HD of the printing apparatus, and a volume of the HD is unnecessarily used.

SUMMARY OF THE INVENTION

In order to solve the above-mentioned problem, the present invention provides a document management system, including: a transfer unit configured to transfer a copy of a stored document to a media which is mounted to the document management system; a disabling unit configured to disable a deletion processing with respect to the stored document after the stored document has been transferred; and a decision unit configured to decide whether the disabling of the deletion processing with respect to the stored document is cancelled in a case where the media is mounted to the document management system again.

Further features of the present invention will become apparent from the following description of exemplary embodiments with reference to the attached drawings.

BRIEF DESCRIPTION OF THE DRAWINGS

FIG. 15 illustrates a structure of document management information according to the embodiment of the present invention.

FIG. 16 illustrates a structure of an audit trail log list included in document information according to the embodiment of the present invention.

DESCRIPTION OF THE EMBODIMENTS

Hereinafter, embodiments of the present invention will be described in detail with reference to the drawings. First, a description will be provided of a document management system which is a premise of the present invention.

Figure 1:
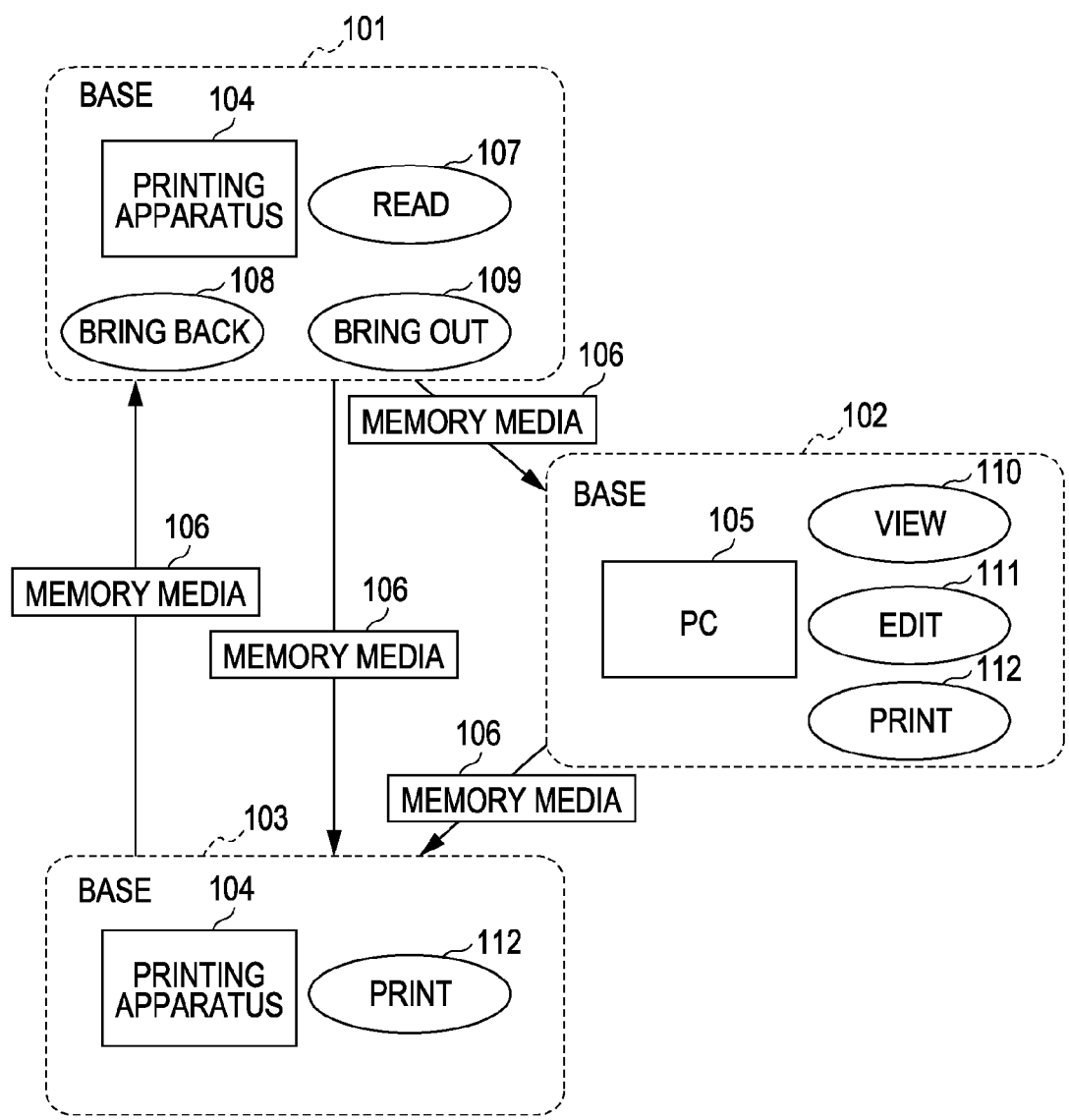
FIG. 1 illustrates a document management system according to an embodiment of the present invention.

FIG. 1 illustrates a document management system according to an embodiment of the present invention.

In FIG. 1, reference numerals 101, 102, and 103 denote bases which are geographically away from each other, such as a branch office and a business institution. In the base 101 and the base 103, a printing apparatus 104 is installed. The printing apparatus 104 is composed of an MFP (Multi Functional Peripheral) which can store a document sent via a network or a document scanned by a scanner as a document. In the base 102, a PC (personal computer) 105 is installed.

A memory media 106 illustrated in FIG. 1 is a removal media such as a USB memory which can be detachably attached to the PC 105 and the printing apparatus 104. The memory media 106 stores the document. Also, the memory media 106 is used for document transfer among the respective bases. It is noted that in this specification, the media functions as a document saving apparatus. Thus, the removal media functions as a removable document saving apparatus.

Reference numerals 107 to 112 illustrated in FIG. 1 represent tasks demanded by a user at the respective bases. First, the user demands at the base 101 that the document stored in the printing apparatus 104 or the document read by the scanner on the basis of a read task 107 is stored on the memory media 106 to be brought out (reference numeral 109). The user moves while carrying the memory media 106, and at the base 102 where the PC 105 is installed, the user demands to view the document stored on the memory media 106 (reference numeral 110), edit (reference numeral 111), and print (reference numeral 112). Alternatively, the user demands to print the document stored on the memory media 106 (reference numeral 112) by the printing apparatus 104 installed in the base 103. Finally, the user demands to bring back the document stored on the memory media 106 to the base 101 (reference numeral 108).

Figure 2:
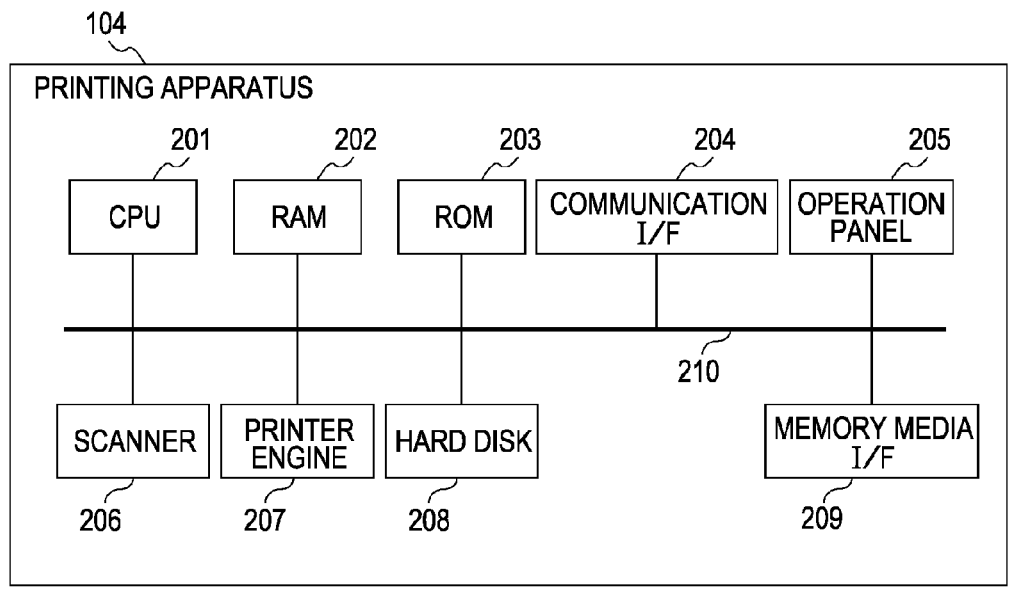
FIG. 2 is a block diagram of basic hardware of a printing apparatus in the document management system according to the embodiment of the present invention.
Figure 3:
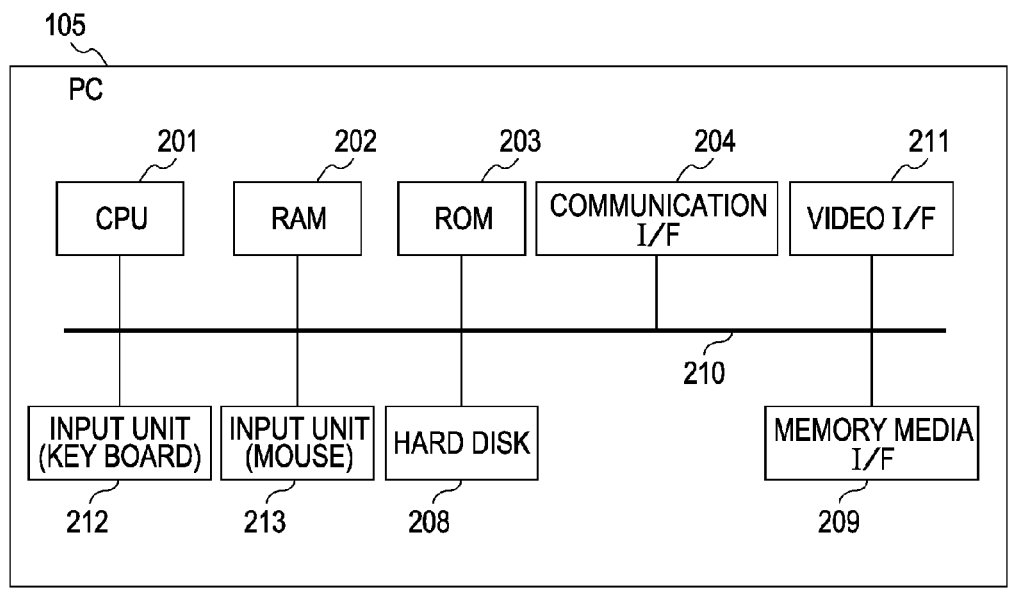
FIG. 3 is a block diagram of basic hardware of a PC in the document management system according to the embodiment of the present invention.

FIG. 2 is a block diagram of basic hardware of the printing apparatus 104 illustrated in FIG. 1, and FIG. 3 is a block diagram of basic hardware of the PC 105 illustrated in FIG. 1.

In the printing apparatus 104 of FIG. 2, elements denoted by reference numerals 201 to 209 are mutually connected via a system bus 210. A CPU 201 of the printing apparatus 104 executes software stored in a hard disk 208 while a RAM 202 is used as a work memory. Also, in the printing apparatus 104, in accordance with an instruction of the user input from an operation panel 205, an operation of the printing apparatus 104 is set. Furthermore, in the printing apparatus 104, an original image is read by a scanner 206, and image data of the original image is generated. Then, the image data is supplied to a printer engine 207, thus carrying out the printing. It is noted that the hard disk 208 can save PDL data, intermediate data, the image data, and the like. Also, the CPU 201 generates the image data on the basis of the PDL data input from an external device via a communication I/F (interface) 204. Then, the CPU 201 carries out the printing by supplying the image data to the printer engine 207, and also can send the image data of the original image read by the scanner 206 to the external device.

A ROM 203 stores so-called BIOS or the like which controls an input and an output of data with respect to the hard disk 208, etc. A memory media I/F (interface) 209 performs an input and an output of data with respect to the memory media 106 which can be detached and attached.

In the PC 105 of FIG. 3, elements denoted by reference numerals 201 to 204, 208, 209, and 211 to 213 are mutually connected via the system bus 210. Herein, reference numeral 211 denotes a video I/F (interface). Also, reference numeral 212 denotes an input unit (key board). Then, reference numeral 213 denotes an input unit (mouse).

The system bus 210 is composed, for example, of a PCI bus, an AGP bus, a memory bus, or the like. The CPU 201 of the PC 105 executes the software stored in the hard disk 208 while the RAM 202 is used as the work memory. It is noted that the hard disk 208 saves an operation system (OS), application software, application data, and the like. The ROM 203 stores so-called BIOS or the like which controls an input and an output of data with respect to the hard disk 208, etc., in cooperation with the operation system. The memory media I/F (interface) 209 performs the input and the output of data with respect to the memory media 106 which can be detached and attached.

Figure 4:
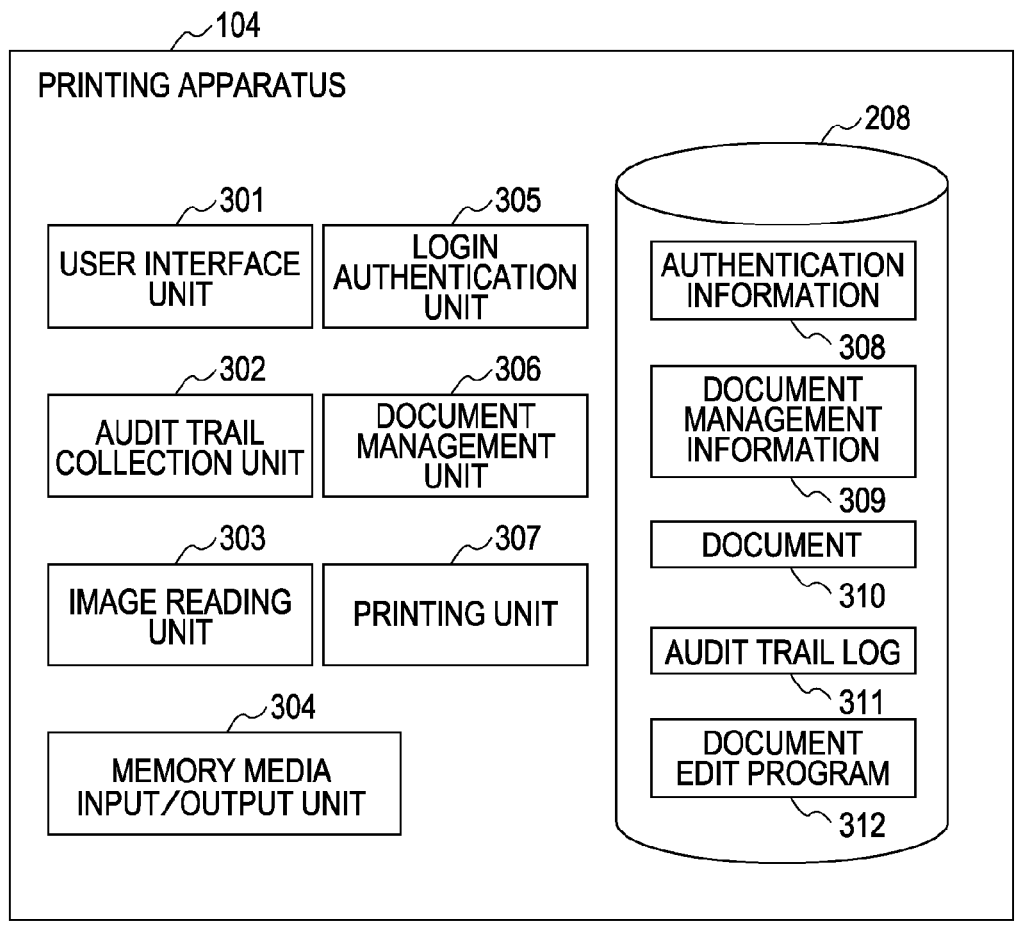
FIG. 4 illustrates a detail of the printing apparatus in the document management system according to the embodiment of the present invention.
Figure 5:
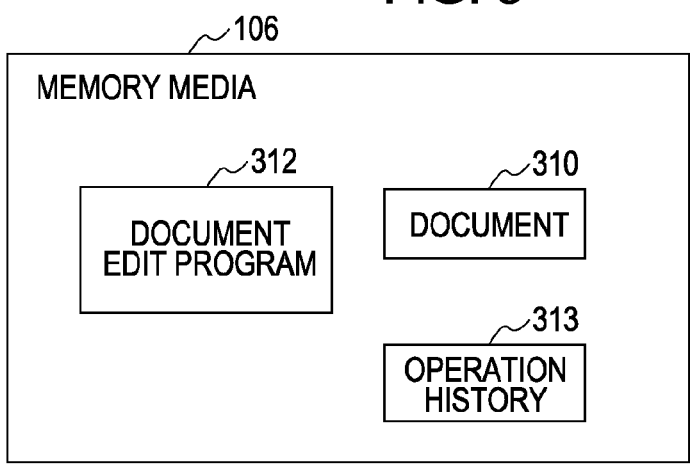
FIG. 5 illustrates a detail of a memory media in the document management system according to the embodiment of the present invention.

FIG. 4 illustrates a detail of the printing apparatus 104 in the document management system of FIG. 1, and FIG. 5 illustrates a detail of the memory media 106 in the document management system of FIG. 1.

The printing apparatus 104 illustrated in FIG. 4 saves authentication information 308 which is referred to at the time of login of the user, a document 310, document management information 309 for managing the document 310, and an audit trail log 311 which is associated with the document 310 in the hard disk 208. Also, the printing apparatus 104 illustrated in FIG. 4 saves in the hard disk 208 a document edit program 312 which is copied in the memory media 106 when the document 310 is brought out.

Also, the printing apparatus 104 includes a user interface unit 301, a login authentication unit 305, a document management unit 306, an audit trail collection unit 302, an image reading unit 303, a printing unit 307, and a memory media input/output unit 304.

The user interface unit 301 accepts an input of the user from the operation panel 205. The login authentication unit 305 carries out a login processing when the user inputs a user ID and a password from the operation panel. The document management unit 306 manages the document 310 saved in the hard disk 208 on the basis of a document management information 309. The audit trail collection unit 302 records an operation with respect to the document 310. The image reading unit 303 generates image data of the original image read by the scanner 206. The printing unit 307 supplies the thus generated image data to the printer engine 207 to carry out the printing. The memory media input/output unit 304 performs an input and an output of data with the memory media 106 which can be detached and attached via the memory media I/F (interface) 209.

On the memory media 106 illustrated in FIG. 5, the document edit program 312 stored in the hard disk 208 of the printing apparatus 104 and the encrypted document 310 are written via the memory media I/F (interface) 209 of the printing apparatus 104. Also, the document edit program 312 is called via the memory media I/F (interface) 209 of the PC 105 to be executed. The document edit program 312 calls the document 310 via the memory media I/F (interface) 209 and writes an operation history 313 where operations with respect to the document 310 are recorded via the memory media I/F (interface) 209.

Figure 6:
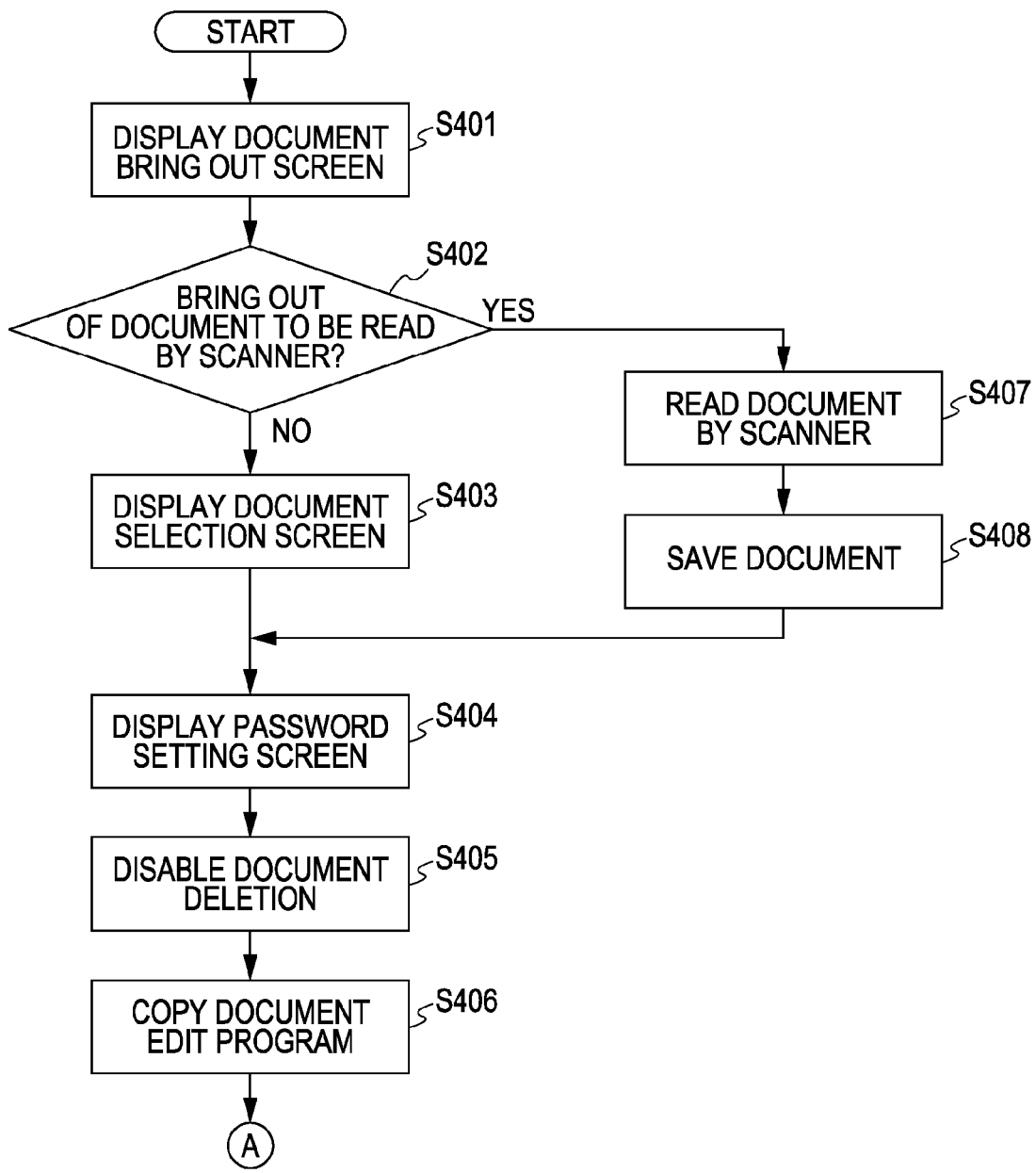
FIG. 6 is a flowchart of a processing until a document is brought out on the memory media in the document management system according to the embodiment of the present invention.
Figure 7:
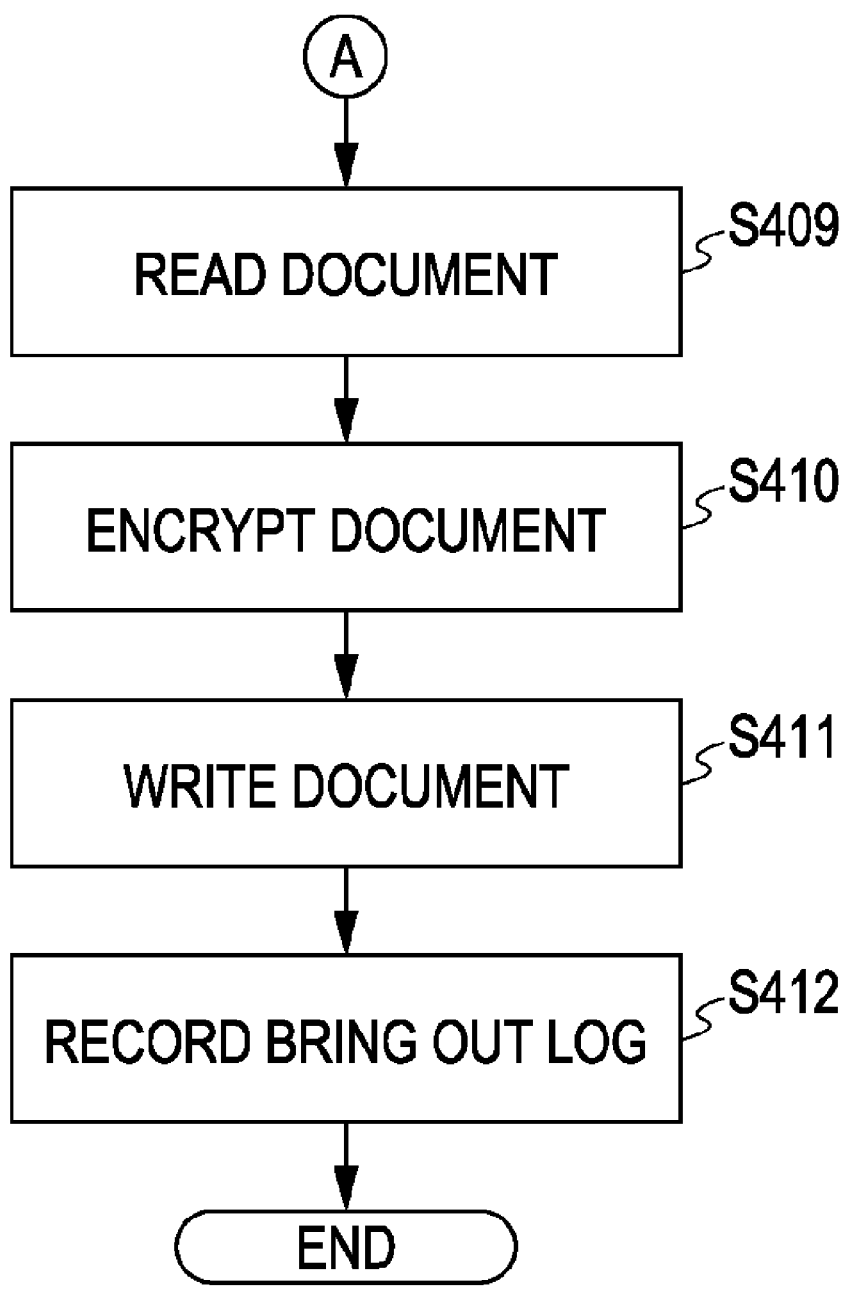
FIG. 7 is a flowchart of a processing until the document is brought out on the memory media in the document management system according to the embodiment of the present invention.

FIGS. 6 and 7 are flowcharts of a processing executed by the audit trail collection unit 302 when the document 310 is brought out on the memory media 106.

In some cases, the document 310 saved in the hard disk 208 of the printing apparatus 104 may be brought out on the memory media 106. Also, in some cases, the document 310 read by the scanner 206 of the printing apparatus 104 may be brought out on the memory media 106.

When the printing apparatus 104 accepts the input of the user ID and the password by the user from a login screen (not shown) which is displayed on the operation panel 205 of the printing apparatus 104, the following processing is executed. That is, the CPU 201 determines whether the user ID and the password accepted by the printing apparatus 104 are correct while the login authentication unit 305 refers to the authentication information 308. When the login is succeeded, the printing apparatus 104 accepts the bringing out of the document instructed by the user through the operation panel 205.

In step S401 of FIG. 6, the CPU 201 displays a document bring out screen on the operation panel 205. Then, the printing apparatus 104 accepts a selection as to whether the brought out document 310 is the document 310 read from the scanner 206 or the document 310 saved in the hard disk 208 of the printing apparatus 104. In step S402, in a case where the CPU 201 determines that the brought out document 310 is the document 310 read from the scanner 206, the following processing is executed. That is, in step S407, the document is read by the scanner 206. Next, in step S408, the read document 310 is temporarily saved by the CPU 201 in the hard disk 208, and the processing is advanced to step S404.

In step S402, in a case where the CPU 201 determines that the brought out document 310 is not the document 310 read from the scanner 206, the following processing is executed. That is, in step S403, the CPU 201 displays a document selection screen for selecting the brought out document 310 from the document 310 saved in the hard disk 208. Next, in step S404, a password setting screen is displayed by the CPU 201. When the printing apparatus 104 accepts a setting of the password from the user, in step S405, the CPU 201 disables the deletion of the document 310 selected on the document selection screen in step S403. That is, the CPU 201 associates a flag with the document 310 indicating that the deletion of the document 310 is disabled.

Herein, the processing in step S405 may be executed by the CPU 201 before the document 310 is brought out on the memory media 106 to be transferred. Also, step S405 may be executed by the CPU 201 while the document 310 is brought out on the memory media 106 to be transferred. Also, step S405 may be executed by the CPU 201 after the document 310 is brought out on the memory media 106 to be transferred.

Next, in step S406, the CPU 201 copies the document edit program 312 store in the hard disk 208 to the memory media 106 mounted to the printing apparatus 104. Then, the processing is advanced to step S409 of FIG. 7.

In step S409 of FIG. 7, the document 310 selected on the document selection screen in step S403 is read by the CPU 201. Then, in step S410, while the password accepted on the password setting screen in step S404 is used as a key, the document 310 is encrypted by the CPU 201. Then, in step S411, the CPU 201 creates a copy of the encrypted document and writes the copy on the memory media 106. Finally, in step S412, the CPU 201 adds a log (bring out log) recording that the document 310 is brought out, to the audit trail log 311 which is stored in the hard disk 208, and the processing is ended.

In a case where the document 310 is brought out on the memory media 106 for plural times, in step S412, the CPU 201 records that effect in the bring out log. Then, in step S412, the document saved in the hard disk 208 in step S403 remains to be saved in the hard disk 208.

In addition, in step S412, the CPU 201 records an effect that the document is brought out, in the document information included the document management information 309.

Figures 8, 9:
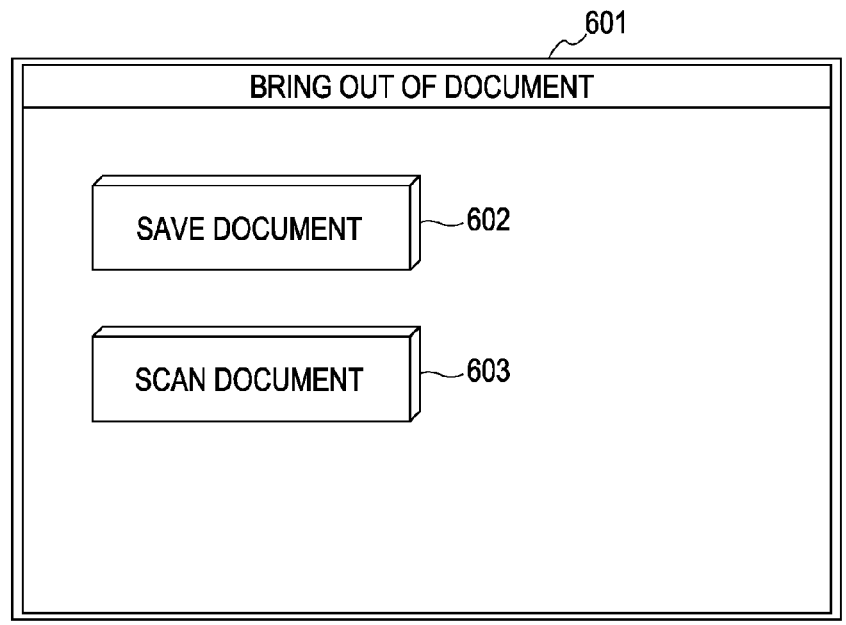
FIG. 8 illustrates a document brought out screen displayed on an operation panel of the printing apparatus according to the embodiment of the present invention.
FIG. 9 illustrates a document selection screen displayed on the operation panel of the printing apparatus according to the embodiment of the present invention.

FIG. 8 illustrates a document brought out screen display in step S401. On the document brought out screen 601, a save document select button 602 for selecting the document 310 which is saved in the hard disk 208 and a scan document select button 603 for selecting the document 310 which is read by the scanner 206.

FIG. 9 illustrates the document selection screen displayed in step S403. On a document selection screen 701, a document list display unit 702 for displaying a list of the documents 310 saved in the hard disk 208 and a brought out instruction button 703 for instructing the bringing out of selected document 703 are arranged.

Figure 10:
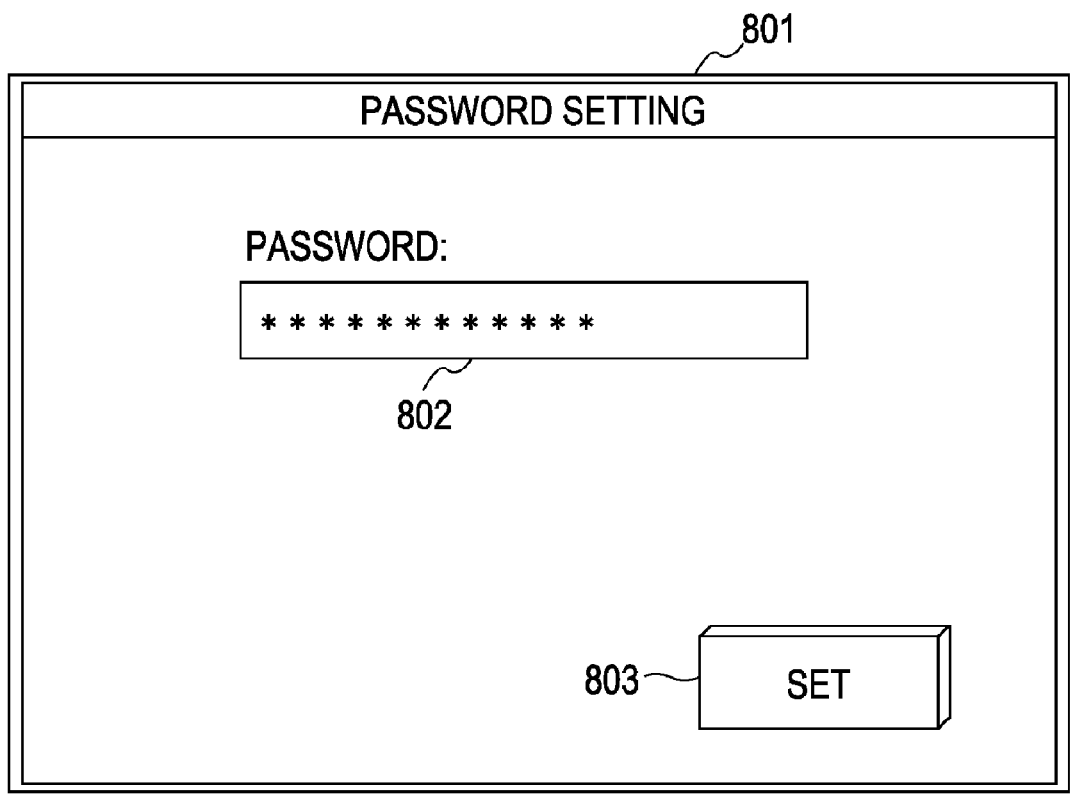
FIG. 10 illustrates a password setting screen displayed on the operation panel of the printing apparatus according to the embodiment of the present invention.

FIG. 10 illustrates the password setting screen displayed in step S404. On a password setting screen 801, a password input unit 802 and a password setting button 803 for setting the input password are arranged.

Figure 11:
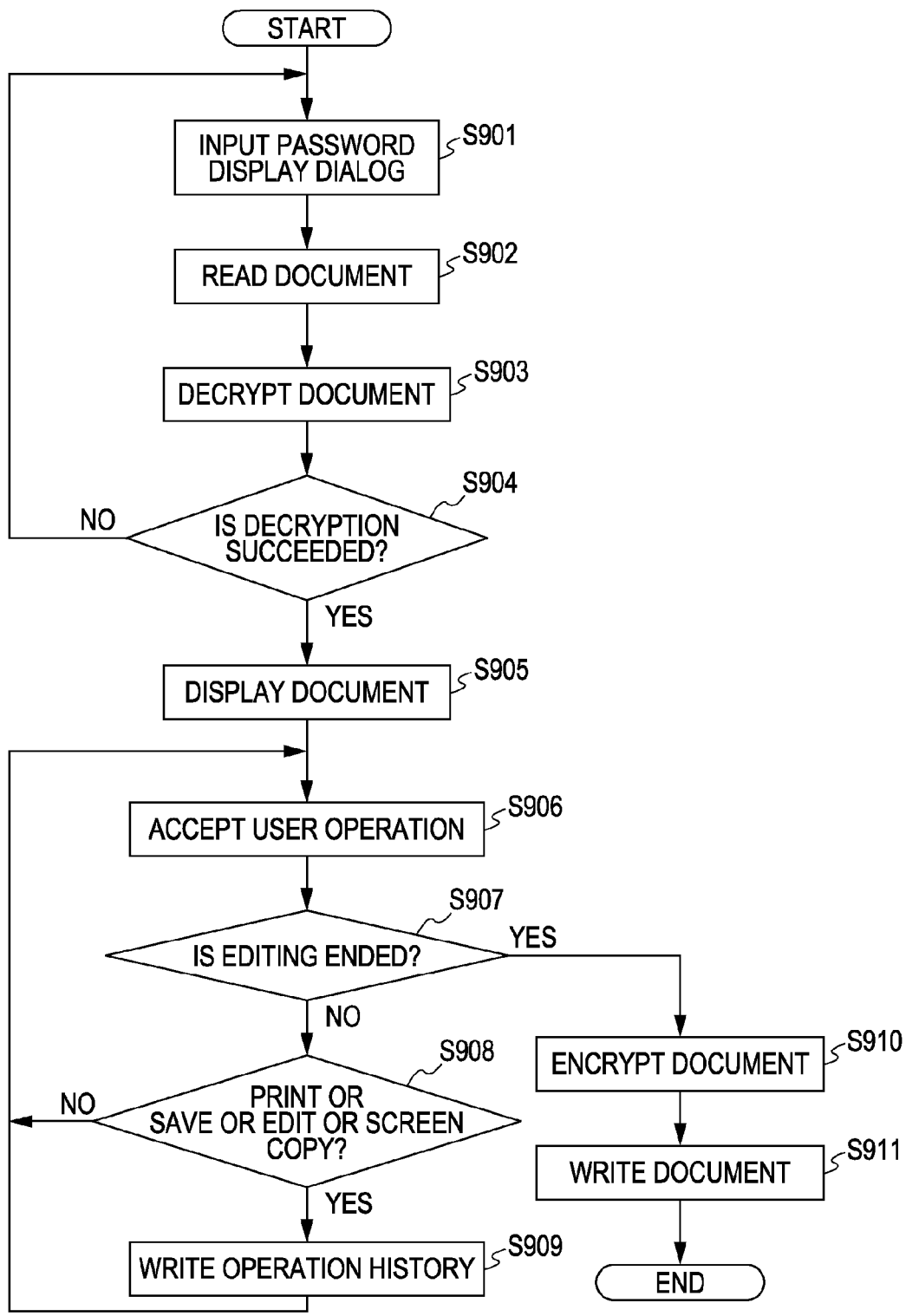
FIG. 11 is a flowchart of a processing in which the document is viewed, edited, and printed with a PC in the document management system according to the embodiment of the present invention.

FIG. 11 is a flowchart of a processing which is executed by the document edit program 312 when the document 310 brought out on the memory media 106 is viewed, edited, and printed with the PC 105.

When the PC 105 executes the document edit program 312 stored on the memory media 106 mounted to the PC 105, in step S901, the CPU 201 displays a dialog box requesting an input of the password which is not shown.

When the PC 105 accepts the input of the password, the following processing is executed. That is, in step S902, the encrypted document 310 stored on the memory media 106 is read into the PC 105. Then, while the password input in step S901 is used as a key, in step S903, the document 310 is decrypted by the CPU 201. At this time, when the password input in step S901 is not matched with the password accepted in step S401 of FIG. 6, the decryption of the document is failed.

Next, in step S904, the CPU 201 determines whether the decryption of the document is succeeded. In a case where the CPU 201 determines that the decryption of the document is failed, the processing is returned to step S901. In step S904, in a case where the CPU 201 determines that the decryption of the document is succeeded, in step S905, the document decrypted by the CPU 201 is displayed on the screen of the PC 105.

Next, in step S906, the PC 105 accepts the operation of the user with respect to the displayed document, and in step S907, the CPU 201 determines whether the operation of the user accepted in step S906 is an instruction for ending the editing. In step S907, in a case where the CPU 201 determines that the operation of the user accepted in step S906 is not the instruction for ending the editing, the following processing is carried out. That is, in step S908, the CPU 201 determines whether the operation of the user accepted in step S906 is print, or save (to another location), or edit, or screen copy (print screen). In step S908, in a case where it is determined as No, the processing is returned to step S906. In step S908, in a case where it is determined as Yes, in step S909, the CPU 201 saves the record regarding the operation of the user accepted in step S906 in the memory media 106 as the operation history 313, and the processing is returned to step S906.

In step S907, in a case where the CPU 201 determines that the operation of the user accepted in step S906 is the instruction for ending the editing, the following processing is executed. That is, in step S910, the CPU 201 encrypts the document 310 while the password input in the password input dialog in step S901 is used as a key. Next, in step S911, the CPU 201 saves the encrypted document 310 in the memory media 106, and the processing is ended.

Figure 12:
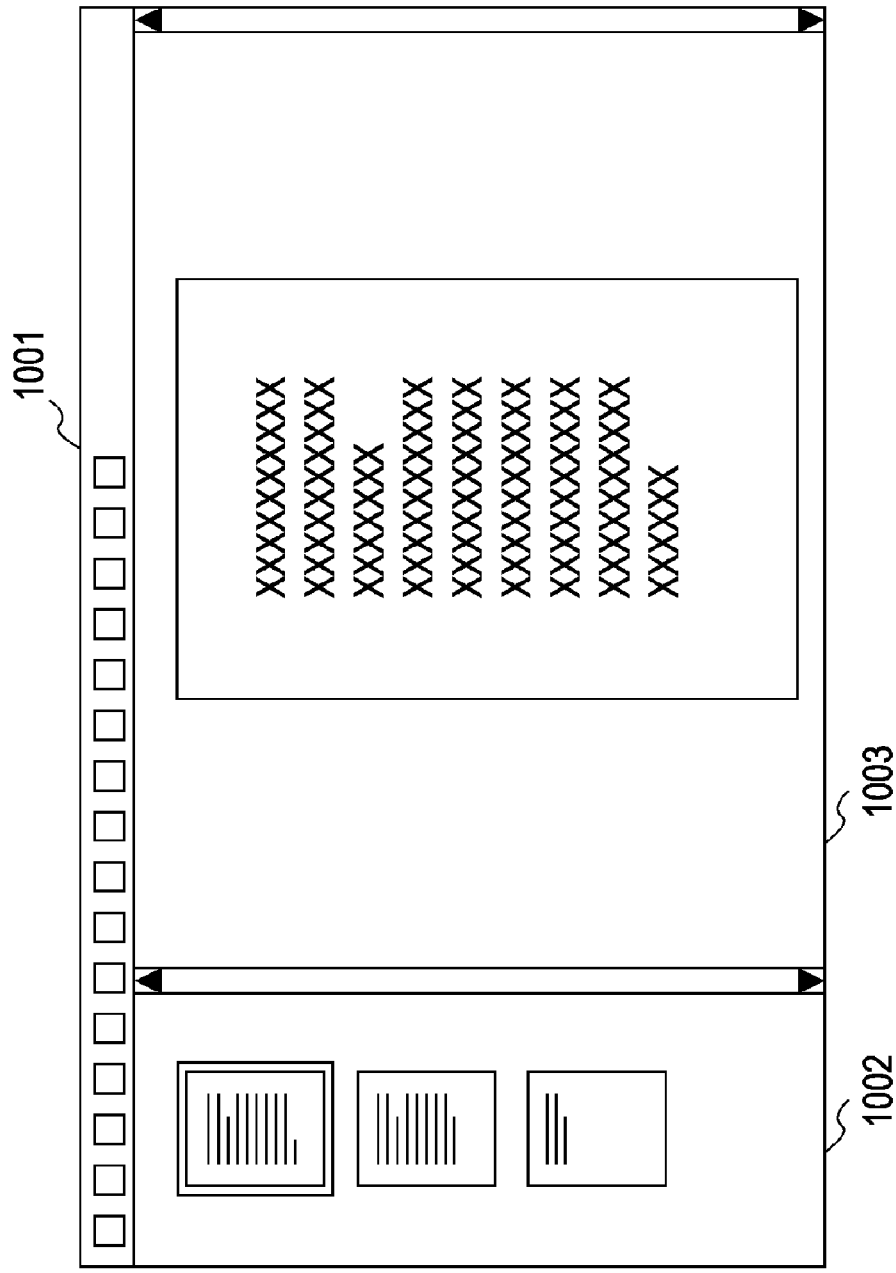
FIG. 12 illustrates a user interface of a document edit program according to the embodiment of the present invention.

FIG. 12 illustrates a UI (user interface) of the document edit program 312 for displaying the document 310 in step S905. The UI of the document edit program 312 has a document display unit 1003, a document scaling down display unit 1002, and a tool bar 1001.

The document display unit 1003 displays the document 310 which is to be edited. The document scaling down display unit 1002 displays a page displayed in the document display unit 1003 and pages before and after the relevant page in a scaling down manner. The tool bar 1001 displays various icons for providing functions for editing the document.

Figure 13:
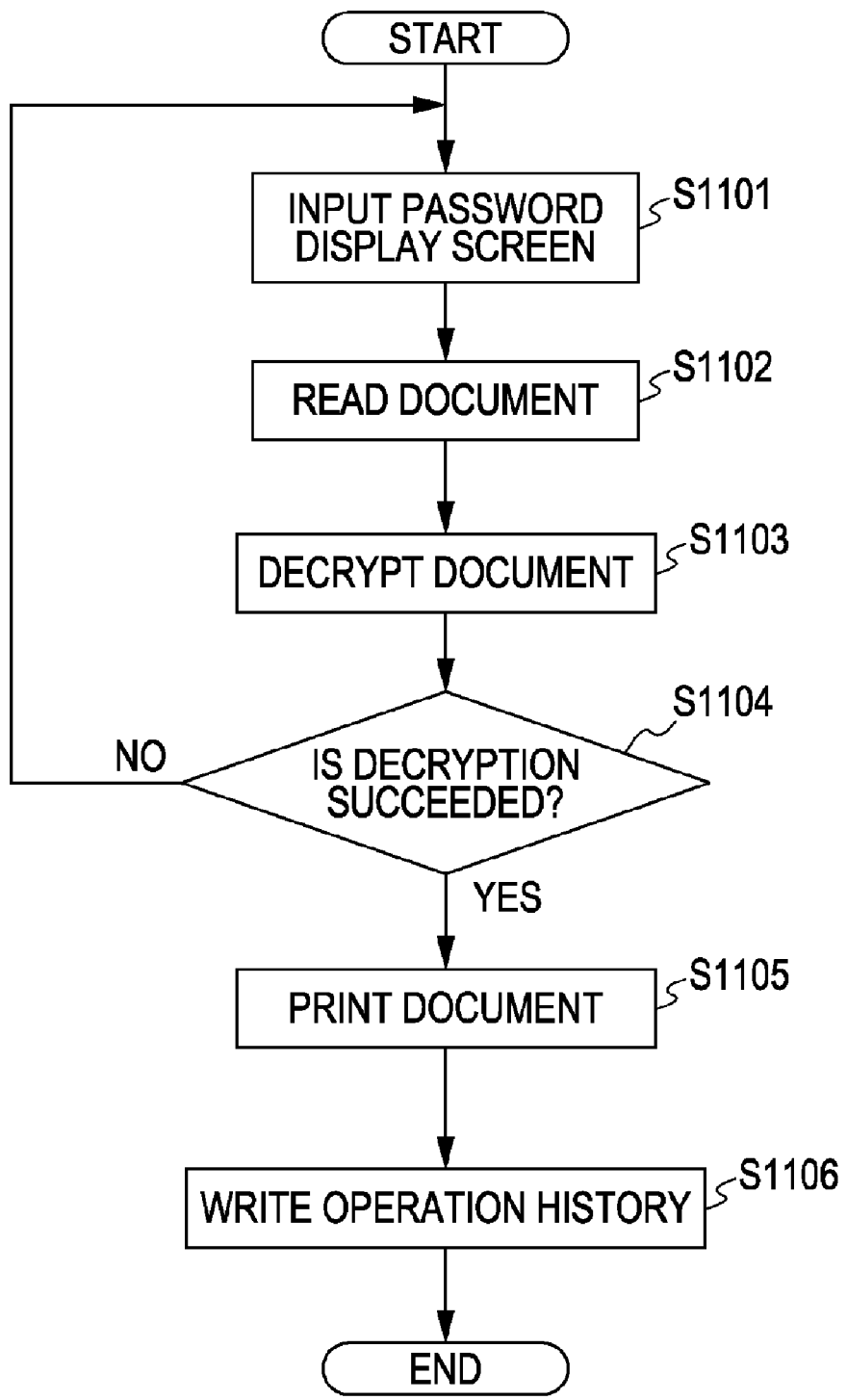
FIG. 13 is a flowchart of a processing in which the document brought out on the memory media is printed by the printing apparatus in the document management system according to the embodiment of the present invention.

FIG. 13 is a flowchart of a processing executed by the audit trail collection unit 302 of the printing apparatus 104 when the document 310 brought out on the memory media 106 is printed by the printing apparatus 104.

When the printing apparatus 104 is mounted to the memory media 106, in step S1101, a screen for requesting an input of the password which is not shown on the operation panel 205 of the printing apparatus 104. When the printing apparatus 104 accepts the input of the password by the user, in step S1102, the CPU 201 reads the encrypted document 310 from the memory media 106.

Next, in step S1103, while the password input on the password input screen in step S1101 is used as a key, the CPU 201 decrypts the encrypted document 310. At this time, the password set in step S404 of FIG. 6 is not matched with the password input in the password input screen in step S1101, the decryption of the document is failed. In step S1104, the CPU 201 determines whether the decryption of the document is succeeded. In a case where the CPU 201 determines that the decryption of the document is failed, the processing is returned to step S1101.

Next, in step S1104, in a case where the CPU 201 determines that the decryption of the document is succeeded, in step S1105, the printing apparatus 104 executes the printing of the decrypted document 310. Then, in step S1106, the CPU 201 saves the record indicating that the printing is executed in the memory media 106 as the operation history 313, and the processing is ended.

Figure 14:
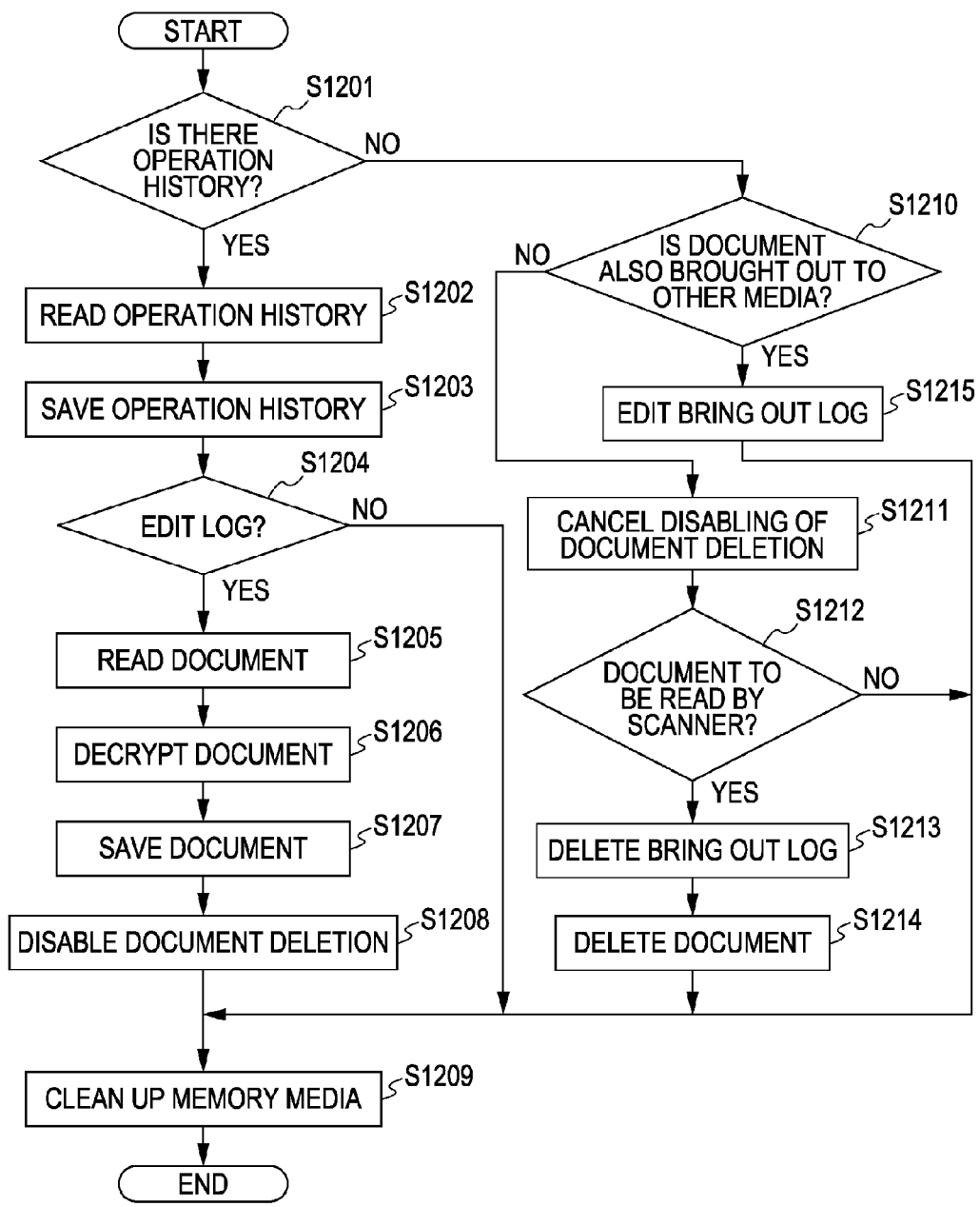
FIG. 14 is a flowchart of a processing in which the brought out document is brought back in the document management system according to the embodiment of the present invention.

FIG. 14 illustrates a processing executed by the audit trail collection unit 302 of the printing apparatus 104 when the document 310 brought out on the memory media 106 is brought back.

When the memory media 106 is mounted to the printing apparatus 104, in step S1201, the CPU 201 determines whether the operation history 313 is recorded on the memory media 106. In step S1201, the CPU 201 determines that the operation history 313 is recorded, in step S1202, the operation history 313 stored on the memory media 106 is read by the CPU 201. In step S1202, the disabling of the deletion processing with respect to the document brought out and transferred on the memory media 106 is not cancelled.

Next, in step S1203, the CPU 201 saves the operation history 313 in the hard disk 208 of the printing apparatus 104 as the audit trail log 311.

Next, in step S1204, the CPU 201 determines whether an edit log is included in the operation history 313 read in step S1202. In a case where the CPU 201 determines that the edit log is not included, the processing is advanced to step S1209. In step S1202, in a case where the CPU 201 determines that the edit log is included in the operation history 313, in step S1205, the encrypted document 310 after the editing stored on the memory media 106 is read into the printing apparatus 104 by the CPU 201.

Next, in step S1206, the CPU 201 decrypts the document 310 while the password set on the password setting screen 801 in step S404 of FIG. 6 is used as a key, and in step S1207, the decrypted document 310 is saved in the hard disk 208 of the printing apparatus 104.

Next, in step S1208, the CPU 201 allows the disabling of the deletion of the save document. Then, in step S1209, the document edit program 312, the encrypted document 310, and the operation history 313 stored on the memory media 106 are deleted, and the processing is ended. That is, without deleting the flag which is associated in step S403, the flag is kept remained as it is (while being associated therewith).

In step S1201, in a case where the CPU 201 determines that the operation history 313 is not recorded, the processing is advanced to step S1210.

In step S1210, the CPU 201 determines whether the document is also brought out on another memory media other than the brought back memory media. In step S1210, in a case where the CPU 201 determines that the document is not also brought out on another memory media other than the brought back memory media, the processing is advanced to step S1211.

In step S1211, the CPU 201 cancels the disabling of the deletion of the document 310 saved in the hard disk 208 of the printing apparatus 104 (whose deletion has been disabled in step S405 of FIG. 6). That is, in step S1211, the CPU 201 turns OFF the flag indicating that the deletion of the document data 310 associated with the document data 310 in step S405 is disabled, and inactivates the flag.

Next, in step S1212, the CPU 201 determines whether the document 310 whose disabling of the deletion has been cancelled in step S1211 is the document 310 read by the scanner 206. In step S1212, in a case where the CPU 201 determines that the document 310 whose disabling of the deletion has been cancelled in step S1211 is not the document 310 read by the scanner 206, the processing is advanced to step S1209. In step S1212, in a case where the CPU 201 determines that the document 310 whose disabling of the deletion has been cancelled in step S1211 is the document 310 read by the scanner 206, the following processing is executed. That is, in step S1213, the CPU 201 deletes the bring out log (recorded in step S412 of FIG. 7) from the audit trail log 311 which is stored the hard disk 208 of the printing apparatus 104.

Next, in step S1214, the CPU 201 deletes the document 310 whose disabling of the deletion has been cancelled in step S1211 from the hard disk 208 of the printing apparatus 104. Then, the CPU 201 records an effect that the document brought out is not performed, in the document information included in the document management information 309. After that, the processing is advanced to step S1209.

Through the processing in step S1214, it is possible to meet such a desire of the user that the document read by the user is desired to be saved only on the memory media.

In step S1210, the CPU 201 determines that the document is brought out on another memory media other than the brought back memory media, the processing is advanced to step S1215. In step S1215, the CPU 201 edits the bring out log (recorded in step S412 of FIG. 7) and records the brought back memory media in the bring out log. After the processing in step S1215 is ended, the processing is advanced to step S1209.

FIG. 15 illustrates a structure of the document management information 309 for managing the document 310 saved in the hard disk 208 of the printing apparatus 104. The document management information 309 also includes document information including a document ID, a document name, an owner name, a size, the number of pages, an accept date time, a print, a data file name, a data type, a scan document flag, a deletion disabling flag, a bring out password, and an audit trail log list. In addition, the document management information 309 also includes the presence or absence of the brought out document.

The document information is generated by the CPU 201 when the document 310 is saved in the hard disk 208 of the printing apparatus 104, and added to the document information list. Also, when the document 310 scanned in step S408 of FIG. 6, the document information is generated by the CPU 201 and added to the document information list. Then, in step S1214 of FIG. 14, the document information is cleared from the document information list by the CPU 20 to be deleted. Also, the information displayed on the document list display unit 702 on the document selection screen 701 of FIG. 9 is generated from the document information by the CPU 201.

The data file name included in the document information refers to the document 310 stored in the hard disk 208 of the printing apparatus 104. The scan document flag is a flag to be set as ON in a case where the CPU 201 determines Yes in step S402 of FIG. 6. In step S1212 of FIG. 14, the CPU 201 determines whether the scan document flag is ON. The deletion disabling flag is a flag to be set as ON in step S405 of FIG. 6 and in step S1208 of FIG. 14, and to be set as OFF in step S1211 of FIG. 14. The bring out password is an area for saving the password input when the document 310 is brought out, and the password input on the password setting screen 801 in step S404 of FIG. 6 is set. At the time of bringing back the document 310, when the encrypted document 310 is decrypted in step S1207 of FIG. 14, the CPU 201 uses the set bring out password.

FIG. 16 illustrates a structure of an audit trail log list included in the document information of FIG. 15. The audit trail log list is a list of the audit trail log 311 including an operating user name, an operation type, an operation date time, and a location. The operating user name included in the audit trail log 311 is a user name input from the operation panel at the time of the login to the printing apparatus 104. When the document 310 is brought back, in a case where the operation history 313 is saved as the audit trail log 311, the operating user name of the bring out log is set. The operating types include editing, printing, saving, screen copy, and bringing out. In step S412 of FIG. 7, the operating type of the log recorded by the CPU 201 is bringing out. In step S909 of FIG. 11, as the operation history 313, the operating types of the log saved on the memory media 106 by the CPU 201 are editing, printing, saving, and screen copy. Also, in step S1203 of FIG. 14, as the audit trail log 311, the operating types of the log saved in the hard disk 208 of the printing apparatus 104 by the CPU 201 are edit, print, save, and screen copy.

Among the items included in the audit trail log illustrated in FIG. 6, the operation date time refers to a date and a time when the operation is carried out, and the location is information for identifying the PC 105 where the operation is carried out or identifying the printing apparatus 104 (a host name, an IP address, or the like). Also, among the items included in the audit trail log illustrated in FIG. 6, the operating type is, as described above, editing, or printing, or saving, or screen copy, or bringing out.

According to the present embodiment, the example in which the document 310 is brought out from the printing apparatus 104 and then brought back has been described, but the document 310 may be brought out from a PC server including the audit trail collection unit 302 (an audit trail collection server) and brought back.

It is noted that according to the embodiment of the present invention, a storage medium (or a recording medium) which stores a program code of software for realizing the functions of the above-described embodiments can be supplied to a system or an apparatus. Then, as a computer (or a CPU or an MPU) of the system or the apparatus reads out the program code stored on the storage medium, the functions of the above-described embodiments can of course be achieved.

In this case, the program code itself read from the storage medium realizes the functions of the above-described embodiments, and the present invention includes the storage medium which stores the program code.

Herein, by executing the program code read by the computer, the functions of the above-described embodiments may also be realized. Also, in addition to the above, on the basis of an instruction of the program code, the operation system (OS) or the like which runs on the computer may perform a part or all of the actual processing. Then, the functions of the above-described embodiments may also be realized by the processing.

Also, the processing in the respective steps in the flowchart may be carried out by a single apparatus or a plurality of apparatuses while the tasks are divided. It is noted that in this specification, the system may refer to a system composed of a single apparatus or a system composed of a plurality of apparatuses in corroboration with each other.

In addition, the processing in the respective steps in the flowchart may, of course, be carried out by a single CPU or a plurality of CPUs.

Furthermore, the program code read out from the storage medium may be written in a storage medium of a function expansion board inserted in the computer or a function expansion unit connected to the computer. After that, a CPU or the like provided to the function expansion board or the function expansion unit may perform a part or all of the actual processing in accordance with an instruction of the program code to realize the functions of the above-described embodiments by the processing.

Also, according to the embodiment of the present invention, the program code of the software for realizing the functions of the above-described embodiments is distributed via a network and may be stored in a hard disk of the system or the apparatus or a storage medium such as a CD-RW or a CD-R. Then, a computer (or a CPU or an MPU) of the system or the apparatus may read out the storage medium or the program stored in the storage medium for the execution.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-208328 filed Aug. 9, 2007, which is hereby incorporated by reference herein in its entirety.

What is claimed is:

1. A document management system, comprising:
    a transfer unit configured to transfer a copy of a stored document to a media which is mounted to the document management system;
    a disabling unit configured to disable a deletion processing for the stored document until the media is mounted to the document management system again; and
    a recording unit configured to record information about to which media the copy is transferred.

2. The document management system according to claim 1, wherein the decision unit includes:
    a determination unit configured to determine whether a predetermined operation is carried out on the copy stored on the media in the case where the media is mounted to the document management system again; and a control unit configured to allow the disabling of the deletion processing with respect to the document in a case where the determination unit determines that the predetermined operation is carried out, and cancel the disabling of the deletion processing with respect to the document in a case where the determination unit determines that the predetermined operation is not carried out.

3. The document management system according to claim 2, wherein a history of the predetermined operation includes a history of printing, saving, and print screen.

4. A document management method, comprising:

transferring a copy of a stored document to a media which is mounted to the document management system;

disabling a deletion processing for the stored document until the media is mounted to the document management system again; and recording information about to which media the copy is transferred.

5. The document management method according to claim 4, further comprising:

determining whether a predetermined operation is carried out on the copy stored on the media in the case where the media is mounted to the document management system again; and allowing the disabling of the deletion processing with respect to the document in a case where it is determined in the determination that the predetermined operation is carried out, and canceling the disabling of the deletion processing with respect to the document in a case where it is determined in the determination that the predetermined operation is not carried out.

6. The document management method according to claim 5, wherein a history of the predetermined operation includes a history of printing, saving, and print screen.

7. A non-transitory computer-readable storage medium saving a program for instructing a computer to execute the steps of the document management method according to claim 4.

* * * * *